US008160243B1

(12) United States Patent
Bean

(10) Patent No.: US 8,160,243 B1
(45) Date of Patent: Apr. 17, 2012

(54) SYSTEM, APPARATUS, AND METHOD FOR THE SECURE STORING OF BULK DATA USING ONE-TIME PAD ENCRYPTION

(75) Inventor: Reginald D. Bean, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 415 days.

(21) Appl. No.: 12/571,758

(22) Filed: Oct. 1, 2009

(51) Int. Cl.
*H04K 1/00* (2006.01)
*H04K 1/04* (2006.01)
*H04L 9/00* (2006.01)

(52) U.S. Cl. ............... 380/28; 380/37; 380/42; 380/46; 380/262; 380/270

(58) Field of Classification Search .............. 380/28, 380/37, 42, 46, 262, 270, 278
See application file for complete search history.

(56) References Cited

U.S. PATENT DOCUMENTS

| 2002/0146119 | A1* | 10/2002 | Liss ............................. 380/42 |
| 2007/0016794 | A1* | 1/2007 | Harrison et al. .............. 713/182 |
| 2008/0208758 | A1* | 8/2008 | Spiker et al. .................. 705/70 |

* cited by examiner

*Primary Examiner* — Mohammad Reza
(74) *Attorney, Agent, or Firm* — Donna P. Suchy; Daniel M. Barbieri

(57) ABSTRACT

A present novel and non-trivial decryption system and methods are disclosed for the secure storing of bulk data using one-time pad ("OTP") encryption. A storage device could be initialized with an OTP prior to encrypting data received from a data source. Parts of the OTP may be retrieved and used to encrypt the data. Once the data has been encrypted, it may be stored in the same location(s) from where parts of the OTP were retrieved with an optional sterilization of the locations being performed during the encryption process. Besides a data source, an initialize station could be used to facilitate the initializing of the OTP onto the storage device, storing OTP parameters corresponding to the OTP, and deleting the OTP. Additionally, a retrieval station could be used to facilitate the retrieval and decryption of encrypted code using the OTP used in the encryption process.

19 Claims, 4 Drawing Sheets

SYSTEM, APPARATUS, AND METHOD FOR THE SECURE STORING OF BULK DATA USING ONE-TIME PAD ENCRYPTION

BACKGROUND OF THE INVENTION

1. Field of the Invention

This invention pertains generally to the field of storage devices used for the storage of data encrypted utilizing a one-time pad ("OTP") encryption scheme.

2. Description of the Related Art

In a system where bulk storage of sensitive data occurs, stored data can be protected prior to being stored by using one or more encryption techniques. Storage of encrypted data may require additional computational resources and may cause throughput constraints due to the speed of encryption operations. In a system that is constrained to size, weight, and power, computational resources running at a high speed may exceed size, weight, and power maximums. In other systems, data that should be stored as protected may be stored unprotected.

In a system of mass storage, manufacturers or producers of mass storage devices may initialize the state of the storage device with 0's or 1's prior to data being initially written onto the device. Rather than leave the storage device in such state, it may be loaded with an OTP. According to Mr. Bruce Schneier in his book "Applied Cryptography," an OTP is considered a perfect encryption scheme. "Classically, a one-time pad is nothing more than a large nonrepeating set of truly random key letters, written on sheets of paper, and glued together in a pad. In its original form, it was a one-time tape for teletypewriters. The sender uses each key letter on the paper. Encryption is the addition modulo 26 of the plaintext character and the one-time pad key character."

"Each key letter is used exactly once, for only one message. The sender encrypts the message and then destroys the used pages of the pad or used section of the tape. The receiver has an identical pad and uses each key on the pad, in turn, to decrypt each letter of the ciphertext. The receiver destroys the same pad pages or tape section after decrypting the message. New message—new key letters . . . . Since every plaintext message is equally possible, there is no way for the cryptanalyst to determine which plaintext message produces a completely random ciphertext message and no amount of computing power can change that."

The power of the OTP encryption scheme may be employed for data provided from a data source such as image data representative of a visual scene captured by a video camera. By analogy, image data may be treated as the message subjected to a OTP encrypted scheme, where the OTP comprises key characters.

BRIEF SUMMARY OF THE INVENTION

A present novel and non-trivial decryption system and methods are disclosed for the secure storing of bulk data using an OTP encryption technique. The disclosures herein leverage the storage space available on a storage device to store an OTP for use as the encryption mechanism for the future data placed onto the storage device. As disclosed herein, a storage device could be initialized with an OTP prior to encrypting data received from a data source. After initialization, parts of the OTP may be retrieved and used to encrypt the data. Once the data has been encrypted, it may be stored in the same location(s) from where parts of the OTP were retrieved.

In one embodiment, a system is disclosed for the secure storage of data. The system comprises a data source, storage device initialized with an OTP, and combine and control engine ("CCE"). The CCE is configured or programmed to receive data from a data source, retrieve a part of the OTP, encrypted the data with that part of the OTP, and store the resulting encrypted data in the storage device. As embodied herein, the location of storing the encrypted data could be the same location from where the part of the OTP was retrieved, and the CCE could sanitize such location prior to storing the encrypted data. In an additional embodiment, the system could comprise an initializing station could initialize and provide the OTP for initializing the storage device with the OTP prior to the encryption process and/or delete the OTP while retaining OTP generation parameter(s). In an additional embodiment, the system could comprise a retrieval station which could retrieve encrypted data, retrieve the encryption OTP, and decrypt the encrypted data. In an additional embodiment, the system could comprise a retrieval station which could retrieve the encrypted data, recover an identifier corresponding to an OTP and corresponding OTP generation parameter(s), create an OTP based on the OTP generation parameters, and decrypt the encrypted data. In an additional embodiment, the system could comprise an initializing and retrieval station for performing the functions of an initializing station and a retrieval station.

In another embodiment, an apparatus is disclosed for the secure storage of data. The apparatus comprises a CCE, an interface for facilitating the transfer of data between a data source and a CCE, and an interface to facilitate the transfer of data between a storage device and the CCE. The CCE may be configured or programmed as discussed above. In an additional embodiment, the apparatus could comprise an interface to facilitate the transfer of data between an initialize station and the CCE, where the initializing station could perform the functions as discussed above. In an additional embodiment, the apparatus could comprise an interface to facilitate the transfer of data between a retrieval station and the CCE, where the retrieval station could perform the functions as discussed above. In an additional embodiment, the apparatus could comprise an interface to facilitate the transfer of data between an initializing and retrieval station and the CCE, where the initializing and retrieval station could perform the functions of an initializing station and a retrieval station as discussed above.

In another embodiment, a method is disclosed for the secure storage of data. The method comprises the receiving of data from a data source, retrieval a part of the OTP, encrypting the data with that part of the OTP, and storing the resulting encrypted data in the storage device. As embodied herein, the location of storing the encrypted data could be the same location from where the part of the OTP was retrieved, and the method could further comprise sanitizing such location prior to storing the encrypted data. As embodied herein, additional methods for generating an OTP and recovering OTP-encrypted data are disclosed.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
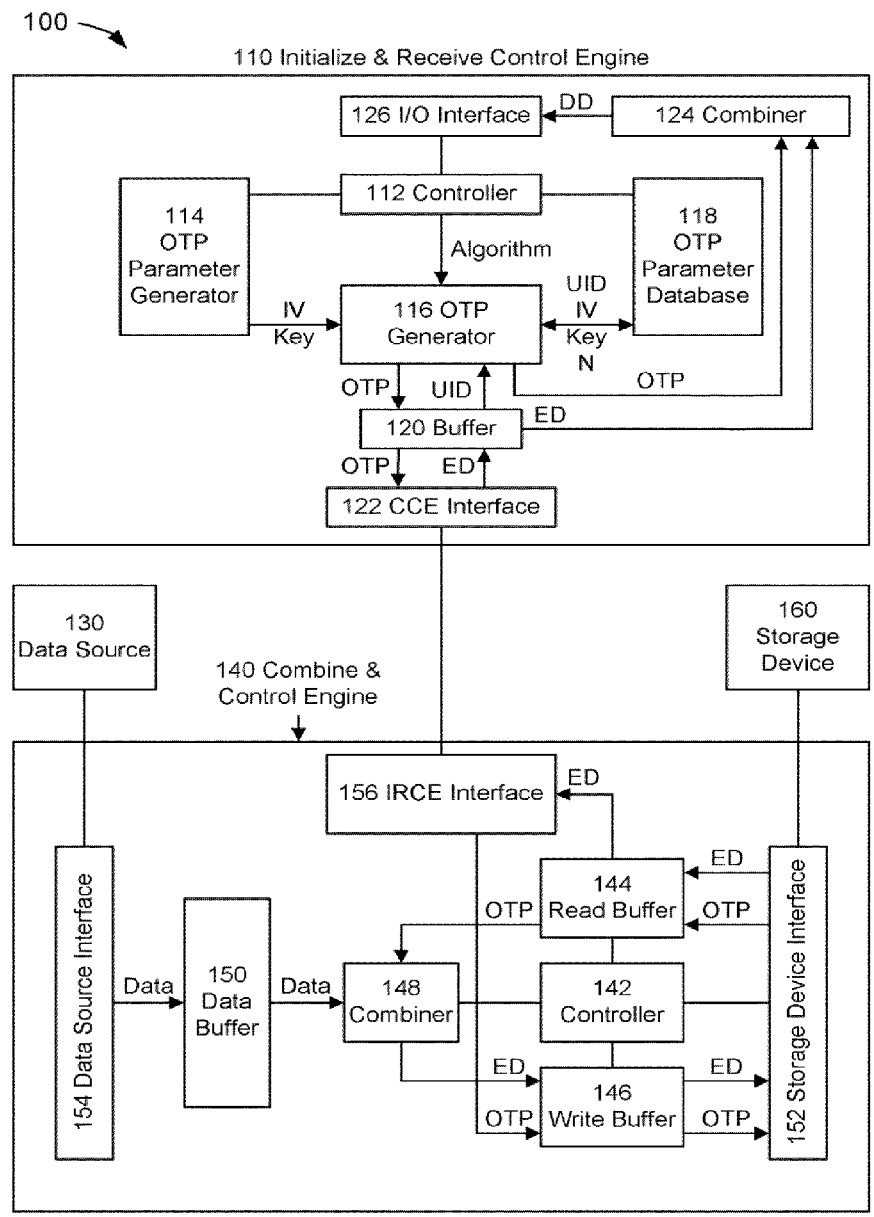
FIG. 1 depicts a block diagram of a secure bulk data storage system using OTP encryption.

FIG. 1 depicts a block diagram of a secure bulk data storage system 100 suitable for implementation of the techniques described herein. The storage system 100 of an embodiment of FIG. 1 may include an initialize and retrieve engine ("IRCE") 110, a data source 130, a combine and control engine ("CCE") 140, and/or a bulk data storage device ("storage device") 160. It should be noted that the discussion herein may be drawn to an anti-tamper solution specifically for the storage of data within a miniaturized military electronics platform. Although the discussion may be drawn to such military electronics platform, the embodiments disclosed herein are not limited to such a platform but may be employed to facilitate the secure storage of bulk data in a non-military electronics platform.

In an embodiment of FIG. 1, the IRCE 110 may be any component that could manage at least one one-time pad ("OTP") including, but not limited to, the generation of an OTP, the initialization of the storage device 160, the retrieval of data encrypted with an OTP, and/or the decryption of retrieved data. When used in conjunction with the Shadow UAV, the IRCE 110 could made part of any processor-based station such as, but not limited to, a laptop computer with a universal serial bus ("USB") port for interfacing with a CCE 140. The IRCE 110 could operate within a windows environment and may provide a user with a graphical user interface ("GUI") for initializing and/or retrieving data from the storage device 160. When used in conjunction with a miniaturized military electronics platform, a station containing the IRCE 110 could be kept safely away from an enemy location; for example, the IRCE 110 could be kept in the possession of personnel in a rear echelon from where a Shadow UAV is launched. As illustrated by the architecture depicted in FIG. 1, the IRCE 110 could include, but not be limited to, a controller 112, OTP parameter generator 114, OTP generator 116, OTP parameter database 118, buffer 120, CCE interface 122, combiner 124, and/or input/output device ("I/O") interface 126. It should be noted that although the conjunction "and" has been used in describing an IRCE, the IRCE may configured to initialize a storage device with an OTP only, retrieve data encrypted with an OTP from CCE 140 only, or both.

In an embodiment of FIG. 1, data source 130 could be any source which in capable of generating data that requires storage and protection from reverse engineering. Data source 130 could be one or more systems that produce data representative of, but not limited to, streaming video, flight parameters, digital images, and/or radar information.

In an embodiment of FIG. 1, CCE 140 could control the initialization of the OTP onto the bulk data storage device 140 and retrieval of encrypted data as managed by an IRCE 110. Also, CCE 140 could perform "real time" processing of data including, but not limited to, the receiving data from data source 130, the encryption of such data, and the storage of the encrypted data in storage device 160, where it may be subsequently retrieved and decrypted by IRCE 110. As illustrated by the architecture depicted in FIG. 1, CCE 140 could comprise the following blocks: controller 142, read buffer 144, write buffer 146, combiner 148, data buffer 150, storage device interface 152, data source interface 154, and/or IRCE interface 156.

CCE 140 could be implemented using commercial, off-the-shelf ("COTS") components. The combination and control functions of CCE 140 could be implemented using any processor or electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory including flash memory, PCMCIA or PC Card, secure digital cards, and compact flash cards. A processor may be driven by the execution of software or source code containing algorithms developed for the specific functions embodied herein. It should be noted that, as embodied herein, the terms "programmed" and "configured" are synonymous. Common examples of electronic data processing units are microprocessors, Digital Signal Processors (DSPs), Programmable Logic Devices (PLDs), Programmable Gate Arrays (PGAs) (e.g., a Field PGA), and signal generators; however, for the embodiments herein, the term processor is not limited to such processing units and its meaning is not intended to be construed narrowly. For instance, a processor could also consist of more than one electronic data processing units. As embodied herein, a processor could be a processor(s) used by or in conjunction with any other system including, but not limited to, a processor(s) associated with data source 130 and/or storage device 160. As embodied herein, a processor could include a controller.

In an embodiment of FIG. 1, storage device 160 could be any device(s) used for storing data. Storage device 160 may be initialized with data representative of an OTP and later rewritten with data provided by data source 130 and encrypted by CCE 140 using the OTP initialized in storage device 160 as discussed in detail below. As embodied herein, storage device 160 could comprise one or more of the digital memory devices or computer-readable media discussed above. The choice of a storage device 160 could depend on one or more factors including, but not limited to, storage capacity, storage density, environmental exposure, mechanical reliability, memory access times and latency, and/or power requirements.

Figure 2:
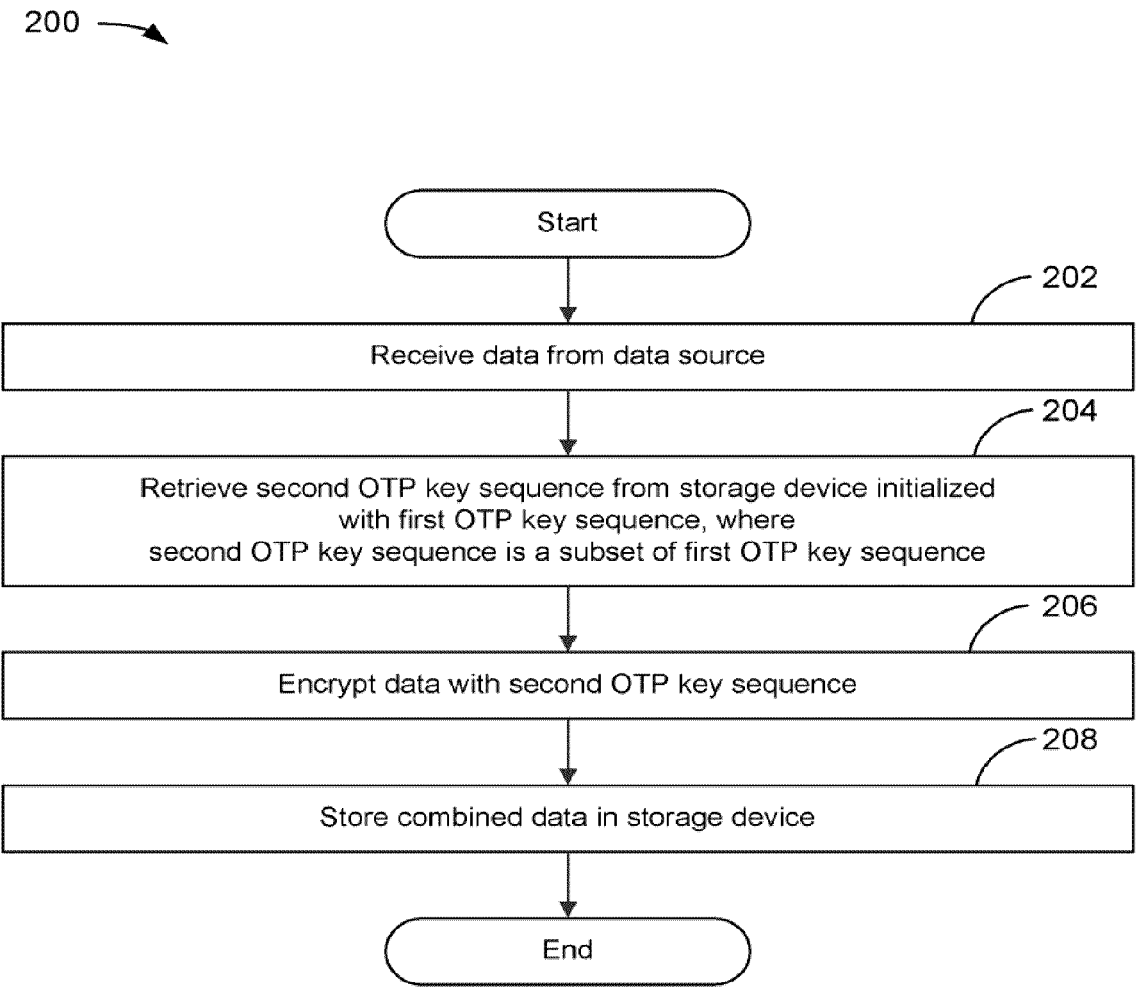
FIG. 2 depicts a flowchart of a method for securing bulk data in a storage system.

The advantages and benefits of the embodiments discussed herein may be illustrated using some of the methods that may be employed in secure bulk data storage system 100. In an embodiment of FIG. 2, flowchart 200 provides an exemplary method employed in secure bulk data storage system 100. The flowchart begins with module 202 with the receiving of data from data source 120. The flowchart continues with module 204 with the retrieving of an OTP from storage device 160 that has previously been initialized with an OTP. That is, the retrieved OTP has been previously written to the storage device.

In an exemplary embodiment herein, the receiving of data of module 202 and the retrieving of an OTP of module 204 may be performed simultaneously (i.e., in parallel) by a controller 142 as depicted in FIG. 1. Controller 142 may buffer input data received by CCE 140 into data buffer 150 through data source interface 154. While data is being buffered into a data buffer 150, an equal size of an OTP may be read from storage device 160 through storage device interface 152 and buffered into read buffer 144. It should be noted that a subset of the OTP commensurate with size of the input data may be retrieved and not the entire OTP used in the initialization of storage device 160.

The flowchart continues with module 206 with the encrypting of the data with the OTP retrieved from the storage device 160 of FIG. 1. Controller 142 may enable a combiner 148 to take the data from the data buffer 150 and the OTP from the read buffer 144 and encrypting them together. More than one scheme for encryption may be available or selected although a simple encryption schemes could suffice. For example, the encryption may be performed applying a simple bit-by-bit exclusive-OR ("XOR") operation to the contents of the data and read buffers; an XOR operation has almost no impact to the size, weight, and/or power of a system and/or module which may employ this method.

The flowchart continues with module 208 with the storing of the encrypted data into the storage device 160 of FIG. 1. Controller 142 may write the encrypted data ("ED") in the write buffer 146 back out to the storage device 160 via storage device interface 152; moreover, the encrypted data may be written into the same location aligning with the OTP retrieved in module 204. Then, flowchart 200 proceeds to the end.

It should be noted that after each block of OTP has been read and placed into read buffer 144 as discussed in module 204, the OTP could still remain on the storage device 160. Also, the write of the encrypted data onto storage device 160 as discussed in module 208 may be insufficient to completely remove all residual information from the storage device 160. Unauthorized use or possession of storage device 160 could lead to an undesirable recovery of the OTP. In an additional embodiment of flowchart 200, controller 142 of FIG. 1 could sanitize the storage device 160 between the retrieve and store operations of modules 204 and 208, respectively. Moreover, such sanitizing operation could be included whenever data is read into read buffer 144.

Figures 3, 4A, 4B:
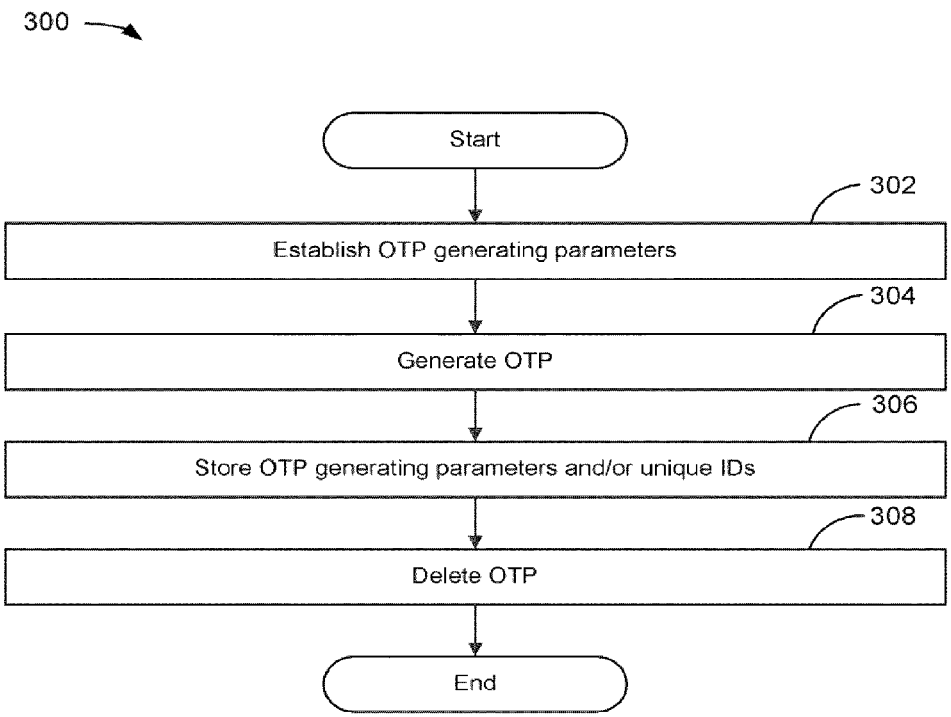
FIG. 3 depicts a flowchart of a method for generating an OTP.
FIG. 4A depicts one possible format of an OTP.
FIG. 4B depicts one possible format for storing generating parameters and/or unique IDs in an OTP parameter database.

In an embodiment of FIG. 3, flowchart 300 provides an exemplary method for generating an OTP. The flowchart begins with module 302 with the establishing of OTP generating parameters. OTP generating parameters could be randomly generated and could include, but are not limited to, an input vector and/or a key. For example, a 512-bit plaintext input vector ("IV") and a 256-bit key could be randomly generated by an OTP parameter generator 114 of FIG. 1.

The flowchart continues with module 304 with the generating of an OTP using an encryption method, standard, and/or algorithm may be utilized for creating an OTP. For example, an Advanced Encryption Standard ("AES") algorithm may be seeded in by controller 112 of FIG. 1 with an IV and a key provided by OTP parameter generator 114 in a chaining block cipher mode. The AES-256 algorithm could be iterated by an OTP generator 116 until the OTP is large enough to partially or completely populate a storage device 160 where the extent of the population could depend on the needs of the user. Part of the OTP could include a unique 256 bit plaintext tag ("unique ID") that will not be used for encryption of data provided by data source 120. One possible format of the OTP is shown in FIG. 4A. It should be noted that, although the preceding discussion has been drawn to seeding an AES-256 encryption standard with a 512-bit plaintext vector and a 256-bit key in a chaining block cipher mode for creating an OTP, the embodiments disclosed herein are not limited to these but could include any method that could be used for creation an OTP.

As embodied herein, the OTP generated by an OTP generator 116 may be used for the initialization of storage device 160 of FIG. 1. That is, writing the generated OTP to storage device 160. CCE 140 could be employed to write the OTP to storage device 160. In an exemplary method, controller 112 could be programmed or configured to provide an OTP from an OTP generator 116 to CCE 140 via the buffer 120 and CCE interface 122, and controller 142 could be programmed or configured to accept the OTP through an IRCE interface 156 and placing the OTP in a write buffer 146 prior to being provided to storage device 160 via the storage device interface 152.

Returning to FIG. 3, the flowchart continues with module 306 with the storing of OTP generating parameters and/or unique IDs. One or more unique Ds could be included, especially if multiple OTPs are created. One possible format for storing generating parameters and/or unique IDs in an OTP parameter database 118 is shown in FIG. 4B.

Returning to FIG. 3, the flowchart continues with module 308 with the deleting of the OTP. It should be noted that the operations of modules 306 and 308 may be performed optionally and could depend on the needs of the user. If an OTP is not stored, then it may be subsequently generated using the OTP generating parameters in an OTP parameter database 118, and one example is discussed in detail below in flowchart 400. Then, the flowchart proceeds to the end.

Figure 5:
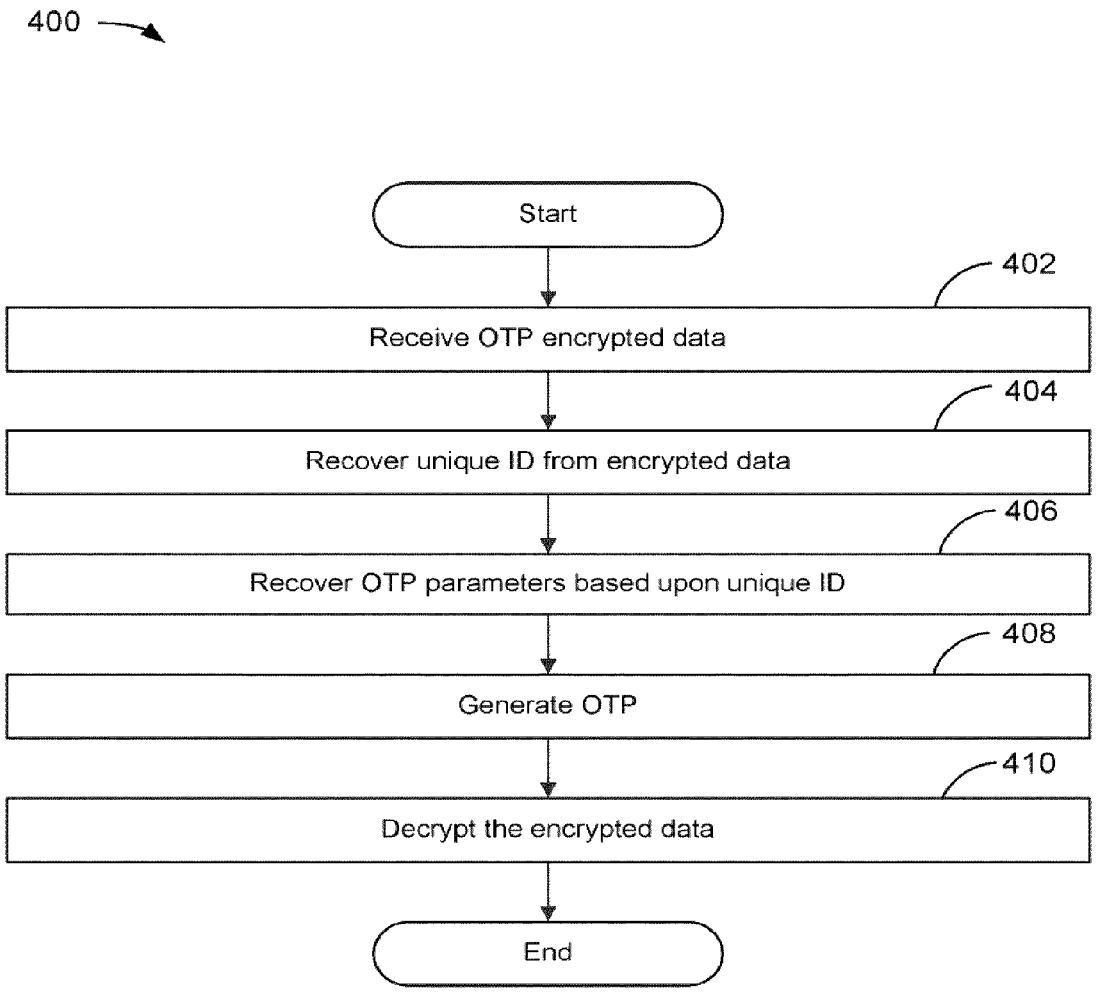
FIG. 5 depicts a flowchart of a method for recovering OTP-encrypted data.

In an embodiment of FIG. 5, flowchart 400 provides an exemplary method for recovering OTP-encrypted data. The flowchart begins with 402 receiving of data encrypted with an OTP. The CCE 140 of FIG. 1 could retrieve encrypted data from storage device 160 of FIG. 1 and provide the encrypted data to the buffer 120 of the IRCE 110 via the IRCE interface 156 and CCE interface 122.

The flowchart continues with module 404 with the recovering of a unique ID from the encrypted data. The controller 112 of FIG. 1 could recover a unique ID from the encrypted data that, as discussed above in module 304, could have been included as part of the OTP that was not used to encrypt data.

The flowchart continues with module 406 with the recovering of OTP parameters based on the unique ID recovered from the encrypted data. As discussed above in module 306, OTP generating parameters and/or unique IDs could have been stored in an OTP parameter database 118.

The flowchart continues with module 408 with the generating of an OTP. The generation of the OTP could be accomplished using the same or similar means as discussed in module 304.

It should be noted that modules 402 through 408, inclusive, provide operations which could used in the generation of an OTP. If the OTP has been preserved, i.e., not been deleted, then a generation of an OTP would not be needed; as such, the operations discussed in those modules would not have to be performed.

The flowchart continues with module 410 with the decrypting of the encrypted data. A scheme that could be employed to perform the decryption may depend upon the scheme used to encrypt the data in the first place. Following the example provided above in module 206 where the data was encrypted by applying an XOR operation to the contents of the data and read buffers, the decryption may be performed by combiner 124 of FIG. 1 by applying the XOR operation to the encrypted data and the OTP. As a result of the decryption, the data originally captured and provided by the data source 120 may be presented to a user in an intelligible form via an I/O interface 126. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for the secure storing of data, said system comprising:
   a data source;
   an initializing station for providing a first OTP; and
   a combine and control engine, operatively coupled to the initializing station, the data source and a storage device, where such engine is configured to
   initialize the storage device with the first OTP;
   receive data from the data source;
   retrieve a second OTP from the storage device, where the second OTP is a subset of the first OTP;
   encrypt the data with the second OTP; and
   store the encrypted data in the storage device.

2. The system of claim 1, wherein the encrypted data is stored in the location of the second OTP.

3. The system of claim 1, wherein the combine and control engine is further configured to sanitize the location of the second OTP.

4. The system of claim 1, wherein the initializing station computes at least one OTP generation parameters; and
   creates the first OTP utilizing the OTP generation parameters and an encryption algorithm.

5. The system of claim 4, wherein the initializing station stores the OTP generation parameters; and
   deletes the first OTP.

6. The system of claim 1, further comprising:
   a retrieval station for retrieving the encrypted data, and
   the combine and control engine, operatively coupled to the retrieval station, where such engine is further configured to provide the encrypted data to the retrieval station.

7. The system of claim 6, wherein the retrieval station
   receives the encrypted data;
   retrieves the first OTP, and
   decrypts the encrypted data with the first OTP.

8. The system of claim 6, wherein the retrieval station
   receives the encrypted data;
   recovers a unique identifier from the encrypted data corresponding to the first OTP;
   recovers OTP generation parameters based upon the unique identifier;
   creates the first OTP utilizing the OTP generation parameters and an encryption algorithm; and
   decrypts the encrypted data with the first OTP.

9. The system of claim 1, further comprising:
   an initialize and retrieve station, wherein such station
   performs the functions of an initializing station, and
   performs the functions of a retrieval station; and
   the combine and control engine, operatively coupled to the initialize and retrieve station, where such engine is further configured to transfer data between the initialize and retrieve station and the storage unit.

10. An apparatus for the secure storing of data, said module comprising:
    an interface to facilitate the transfer of data between a data source and a combine and control engine;
    an interface to facilitate the transfer of data between a storage device and the combine and control engine;
    an interface to facilitate the transfer of data between an initializing station and the combine and control engine; and
    the combine and control engine, operatively coupled to the initializing station, the data source and the storage device, where such engine is configured to
    initialize the storage device with the first OTP provided by the initializing station;
    receive data from the data source;
    retrieve a second OTP from the storage device initialized with a first OTP, where the second OTP is a subset of the first OTP;
    encrypt the data with the second OTP; and
    store the encrypted data in the storage device.

11. The apparatus of claim 10, wherein the encrypted data is stored in the location of the second OTP.

12. The apparatus of claim 10, wherein the combine and control engine is further configured to sanitize the location of the second OTP.

13. The apparatus of claim 10, further comprising:
    an interface to facilitate the transfer of data between a retrieval station and the combine and control engine, and
    the combine and control engine is further configured to provide the encrypted data to the retrieval station.

14. The apparatus of claim 10, further comprising:
    an interface to facilitate the transfer of data between an initialize and retrieve station and the combine and control engine, and
    the combine and control engine is further configured to transfer data between the initialize and retrieve station and the storage unit.

15. A method for the secure storing of data, said method comprising:
    initializing a storage device with a first OTP provided by an initializing station;
    receiving data from a data source;
    retrieving a second OTP from a storage device initialized with a first OTP, where the second OTP is a subset of the first OTP;
    encrypting the data with the second OTP; and
    storing the encrypted data in the storage device.

16. The method of claim 15, wherein the encrypted data is stored in the location of the second OTP.

17. The method of claim 15, further comprising:
    sanitizing the location of the second OTP.

18. The method of claim 15, further comprising:
    providing the encrypted data to a retrieval station.

19. The method of claim 15, further comprising:
    initializing the storage device with the first OTP provided by an initialize and retrieve station; and
    providing the encrypted data to such station.

\* \* \* \* \*